(12) United States Patent
Hemmes

(10) Patent No.: US 6,354,091 B1
(45) Date of Patent: Mar. 12, 2002

(54) APPARATUS AND METHOD FOR THE PRODUCTION OF FROZEN BEADS

(75) Inventor: Paul Hemmes, Mississauga (CA)

(73) Assignee: Spectral Diagnostics, Inc., Toronto (CA)

( * ) Notice: Subject to any disclaimer, the term of this patent is extended or adjusted under 35 U.S.C. 154(b) by 0 days.

(21) Appl. No.: 09/773,762

(22) Filed: Feb. 1, 2001

(51) Int. Cl.[7] ............................................. F25D 17/02
(52) U.S. Cl. ................................................. 62/64; 62/74
(58) Field of Search ............................... 62/74, 64, 66, 62/373

(56) References Cited

U.S. PATENT DOCUMENTS

| | | | | |
|---|---|---|---|---|
| 3,427,816 A | * | 2/1969 | Hnny et al. ..................... | 62/74 |
| 3,431,655 A | * | 3/1969 | Grover et al. ................. | 62/74 |
| 5,664,422 A | * | 9/1997 | Jones ............................. | 62/64 |
| 6,000,229 A | * | 12/1999 | Jones et al. ..................... | 62/74 |

* cited by examiner

Primary Examiner—William E. Tapolcai
Assistant Examiner—Mohammad M. Ali
(74) Attorney, Agent, or Firm—Klauber & Jackson

(57) ABSTRACT

An apparatus and method for producing dry beads of a liquid reagent for use in various methods of analysis. The beads are formed by use of an x-y table that can be translated along both the x and the y axis. An insulated tray containing liquid cryogen is positioned atop the x-y table. A metal grid forms a plurality of cells in the tray so that the cryogen is free to enter the cells up to the level of the cryogen in the tray. The frozen drops form into beads and freely amass on the bottom of the tray. A drop forming device dispenses individual drops to fall by gravity into an individual, discrete cell. The table then translates to position another discrete cell for receiving the subsequent drop of reagent. The movement of the x-y table causes a agitation of the cryogen to enhance the freezing process.

20 Claims, 4 Drawing Sheets

APPARATUS AND METHOD FOR THE PRODUCTION OF FROZEN BEADS

BACKGROUND OF THE INVENTION

The present invention relates to an apparatus and a method for the formation of frozen reagent beads, and more particularly, to an apparatus and method for the freeze forming of such beads comprised of a reagent used to carry out the analysis of a biological agent.

In the analysis of certain biological samples, it is common to use dry beads of specific reagents of a small precisely measured quantity. Such dried beads are commonly used in the analysis of blood assays but are also used with at variety of other analyses for other biological fluids and the reagent composition of the beads can also widely vary depending upon the particular analysis to be performed. As such, therefore, there is a need to produce dry reagent beads of a variety of compositions that are of a uniform size and predetermined characteristics by an apparatus or by using a method that is reliable and that can produce a large quantity of such beads at a rapid rate.

One of the methods of creating such dry chemical reagent beads is to use a freezing technique where the liquid reagent, in the desired amount and composition, is progressively dropped into a liquid cryogen, such as liquid nitrogen, where the liquid drop is fairly rapidly frozen into a reagent bead in a spherical configuration of the predetermined precise quantity. The frozen beads are thereafter harvested in a batch process and further processed by being lyophilized to form the ultimate product that is a dry bead of the desired reagent that dissolves quickly when in contact with the sample to be analyzed.

Thus, it is important to be able to rapidly create a large quantity on a continual basis of the frozen reagent beads such that the overall formation of such spherical beads, can be carried out efficiently and rapidly to produce the reagent beads of a constant, known quantity and contents.

In the production of the reagent bead, therefore, the liquid reagent is produced in the desired final concentration of constituents in liquid form and that liquid is dispensed in the form of drops that fall downwardly by means of gravity into a quantity of the liquid nitrogen. The liquid drop is thus frozen and eventually the frozen droplets fall to the bottom of the liquid nitrogen container. As the one drop is dispensed from the apparatus into the liquid nitrogen, the apparatus readies another drop that thus follows the prior drop after a predetermined elapsed time. The accumulated frozen beads of the particular reagent composition collect in the bottom of the container holding the liquid nitrogen and are periodically harvested, by a batch process, from the bottom of the container holding the liquid nitrogen and the process continued.

There is, therefore, a need for the aforesaid process to produce a large quantity of the final reagent beads in as rapid a period of time as is practical. At the present, the overall freezing process poses a problem to increasing the speed of the overall operation in that there is a physical limitation on the current process relating to the freezing process itself. As the spherical liquid drop is dispensed into the liquid nitrogen, the temperature of the liquid drop is relatively hot as compared with the temperature of the liquid nitrogen and thus, the initial contact between the liquid drop and the liquid nitrogen causes the liquid nitrogen to boil violently and generate a large quantity of nitrogen gas under the drop as it rests upon the surface of the liquid nitrogen.

In effect, the liquid drop floats upon the gaseous nitrogen and is supported so as to not be directly in contact with the much colder liquid nitrogen. That boundary layer of nitrogen gas isolates the liquid nitrogen from direct contact with the liquid drop of reagent and that boundary layer of the nitrogen gas is a poor thermal conductor, thus having a deleterious effect on the rate of freezing of the reagent drop. Obviously, in attempting to increase the rapidity of the overall freezing process, any parameter or effect that reduces the freezing rate is disadvantageous to the overall aim of the apparatus.

Accordingly, the freezing process itself is delayed by the boundary layer that impedes the rapid cooling and freezing of the drop of liquid reagent and thus imposes a severe limitation on the overall throughput of product since any subsequent drop cannot be dispensed until the prior drop has frozen and dropped to the bottom of the liquid nitrogen, otherwise, two drops may fuse together and create an extra large or double sized bead of the reagent and can introduce an inaccuracy with the use of that oversized reagent bead in carrying out a later analysis. However, due to the formation of the boiled nitrogen gas, the drop floats on the surface of the liquid cryogenic until it finally freezes and sinks to the bottom of the cryogen. The time for such freezing and dropping can vary and is dependent upon the size and density of the drop, however, a typical time can be in the order of about six seconds.

Therefore, there is a timewise constraint on the overall freezing process, and left alone, would pose a serious hindrance to any effort at speeding up the present freezing process that depends highly upon the freezing rate of the liquid drop of reagent. It should be noted that the formation of periodic double drops cannot fully and successfully be alleviated through the use of passing all of the frozen reagent beads through a sieve material to try to capture the larger, oversized beads as the particular orientation of the beads as they pass through such a sieve can render the use of a sieve unreliable and thus still not fully solve the problem, that is, even a double bead can, at times, be in the proper orientation so as to pass through a sieve that is sized for a single bead. In addition it is believed to be a better course of action to solve the problem in the first place rather than resort to a remedial effort to minimize the problem of the formation of double sized beads, and thus, a solution to the initial problem would be preferable.

One currently known apparatus for the formation of the frozen reagent beads is shown and described in U.S. Pat. No. 5,275,016 of Chatterjee et al, where an apparatus is provided that has a rotating carousel on which is situated a plurality of trays containing the cryogenic liquid. In the Chatterjee et al patent, therefore, the carousel is rotated so as to position the trays beneath a liquid dispensing means where the drops of reagent are deposited in the liquid filled trays and the carousel continuously rotates. The difficulty with a rotating carousel, however, is that the throughput is also limited by the physical dimensions of the overall apparatus, thus, as one attempts to increase the throughput to achieve a higher production rate of frozen drops of reagent, the diameter of the rotating carousel has to increase outwardly at a drastic rate and cause the overall apparatus to become exceedingly large in order to produce any appreciable increase in the rate of production. This is an inefficient use of the space available to the user with the employment of a rotating carousel that creates a limitation on the rate of production of the frozen reagent drops of the Chatterjee et al apparatus. Too, with a rotary carousel, the linear speed of the carousel varies depending upon the radial position of the drops that fall into the carousel.

In addition, in the Chatterjee et al apparatus, it is stressed that the continuous rotational movement of the carousel, as opposed to a stop and go or intermittent movement, is intended to create a smooth movement so as to prevent agitation of the cryogenic liquid. However, as has been previously discussed, there is a layer of nitrogen gas that forms directly under the liquid drop of reagent as it is in the freezing process resting on the surface of the liquid cryogen and which forms a boundary layer that impedes the freezing process. As such, and to the contrary of the Chatterjee et al smooth movement, it would be preferable to create some agitation or movement of the cryogenic liquid to disrupt that layer of nitrogen gas as such disruption will accelerate the freezing process and allow for a faster rate of production of the frozen beads of reagent.

A further apparatus for the production of frozen droplets is shown and described in U.S. Pat. No. 4,982,577 where the liquid cryogen, such as liquid nitrogen, is caused to flow downwardly along a sluiceway to eventually enter a reservoir, however the entire apparatus including the sluiceway is contained within an insulated vessel in an attempt to minimize the evaporation of the nitrogen which is otherwise very susceptible to such evaporation along the sluiceway and within the reservoir.

Accordingly, it would be advantageous to provide an apparatus and a method for forming frozen beads of a reagent in a manner such that the production rate can be sufficiently high so as to generate the needs of such frozen beads in an expeditious and efficient manner and with enhanced efficiency and use of the available space.

SUMMARY OF THE INVENTION

Now then, in accordance with the present invention, there is provided an apparatus and a method of producing a high rate of uniform frozen beads of a reagent for use in a chemical analysis. In the present invention, therefore, there is provided an apparatus that comprises a heavily insulated tray, preferably of stainless steel, and which contains a quantity of the liquid cryogen, such as liquid nitrogen. Within the tray is a removable grid that is rectangular in configuration and which is, in turn, divided into a plurality of individual cells that are preferably square in cross section. Each cell is made up of cell walls forming a open volume for the free flow of the cryogen through out all of the cells since each cell is open at its bottom so that the liquid cryogen can freely fill each cell from the bottom of the tray up to a uniform level or depth. In the preferred embodiment, the cells are aligned in a plurality of rows along an x axis and the rows are in abutting relationship along the y axis, with each cell providing an isolating environment from the adjacent cell or cells.

The apparatus further comprises a liquid dispenser that causes one drop of liquid reagent at a time to fall, by gravity, downwardly into the liquid nitrogen contained within the tray. There may, in order to optimize the process and increase its throughput, be multiple liquid drop dispensers and, in the preferred embodiment, two of such dispensers may be utilized. Each drop of the liquid reagent is made up of a material in a homogeneous form that is to be used in a later analysis.

The tray filled with liquid nitrogen is positioned upon an x-y positioning table that allows the table to move the tray in directions along both the x and the y axis of that tray. Such tables are commercially available and can be customized for the particular movement desired with respect to speed and movement direction. The typical movement of an x-y table is a stepwise or intermittent motion. In the operation of the present apparatus, therefore, a drop of the liquid reagent is allowed to fall from the liquid dispenser into a predetermined cell within the plurality of cells and the cell is located in that position by the translation of the x-y table and is at rest. After the drop has fallen to the surface of the liquid nitrogen and contained within that designated cell, the x-y table moves the tray along the x axis or y axis so that the translation brings an adjacent cell into alignment beneath the liquid dispenser so that a subsequent drop of a liquid reagent can be dispensed into that next cell. As the apparatus progresses, each drop is successively allowed to fall into subsequently located cells until, in the preferred embodiment, the entire row of cells positioned along the x axis has received a drop of liquid reagent and the x-y table then moves the tray in the direction of the y axis to allow a new row of cells to be utilized.

As such, therefore, the x-y table continues to translate the position of the tray containing the liquid nitrogen along that second row of cells until the end of that row is reached, whereupon the x-y table then moves the tray in the direction of the y axis again to progress to the next row. In such manner, the x-y table progresses through all of the rows of the isolating cells and, in each instance, the drop of liquid reagent is dispensed into an individual cell and the x-y table thus moves the tray to present the next cell into position to receive the next drop of liquid reagent. In the preferred embodiment, the pattern of stepwise movement can be established so as to advance the tray one cell at a time to return the tray, eventually, to its original position with the initial cell in position to receive the drop for a subsequent cycle.

In the aforedescribed manner, each drop is allowed to remain on the surface of the liquid nitrogen in an isolated cell where it freezes and ultimately drops to the bottom of the steel tray, free from the cells. Thus, the formation of a double drop is prevented as the isolation provided by the grid forming the cell walls of each cell prevents any two drops from coming in contact with each other during the freezing process. Once totally frozen, however, the problem of the drops sticking together to form a double drop is alleviated and the frozen drops can thus simply fall and accumulate in the bottom of the tray and be removed by batch process whenever a predetermined number of drops has been formed.

Accordingly, the overall cycle or positioning, stepwise, of all of the cells to receive a drop of liquid reagent can be established to consume sufficient time to assure that the freezing of the first drop in that cycle has completely frozen. Thus, the cells, or more specifically, the cell walls, can extend from just above the surface of the liquid nitrogen i.e. about 1 cm. above, to an intermediate depth below the surface of the nitrogen so that, once the drops are fully frozen into beads, all of the beads can sink to the bottom of the tray to amass together at the bottom where they can remain until removed from the apparatus. At the completion of an entire cycle, the grid can be removed from the tray, leaving the frozen beads at the bottom of the tray to be transferred to a lyophilizer.

Alternative means of harvesting the beads at the bottom of the tray of liquid nitrogen can be used, as one such means, the tray can be constructed so as to have a sloped or inclined bottom surface so that the frozen beads congregate at the lower end of the angled bottom and thus are easier to remove. A further alternate embodiment would be to include some conveyer system at the bottom surface of the tray to automatically remove the frozen beads.

In addition, with the present apparatus, the movement of the tray by means of the x-y table, is preferably an intermittent or stepwise motion, that is, the table positions the applicable cell beneath the liquid drop dispenser where the table is momentarily at rest. After the drop has been administered to the cell currently in the receiving position, the x-y table then moves the tray so as to align the next cell into that receiving position.

Thus, the movement or motion of the tray is not intended to be a smooth, even movement as used in the Chatterjee et al patent to prevent disruption of the liquid nitrogen. To the contrary, with the present apparatus, that intermittent motion causes a deliberate, controlled agitation to the liquid nitrogen to disrupt of the layer of gaseous nitrogen that forms underneath the liquid drop as it rests on the surface of the liquid nitrogen and therefore positively enhances the freezing of the drop to form the frozen bead. Since any disruption of the layer of gaseous nitrogen improves the freezing process, that intermittent motion, itself, increases the throughput of the overall apparatus by speeding the freezing process of the liquid drop of reagent. It should be noted that the controlled agitation is not a jerking motion that would severely disrupt the movement of the tray, but is a controlled acceleration and deceleration such as to cause ripples on the surface of the cryogen and that acceleration and deceleration may be symmetrical or asymmetrical.

In addition, with typical x-y tables for the positioning and translation of the cells of the present invention, the acceleration profile of the table motion can be controlled by the normal software provided with such commercially available x-y tables so as to increase or decrease that agitation to suit the desires of the user by changing the acceleration and deceleration to produce the optimal effect of the freezing process.

These and other characteristics of the present invention will become apparent through reference to the following detailed description of the preferred embodiments and accompanying drawings.

DETAILED DESCRIPTION OF THE INVENTION

Figure 1:
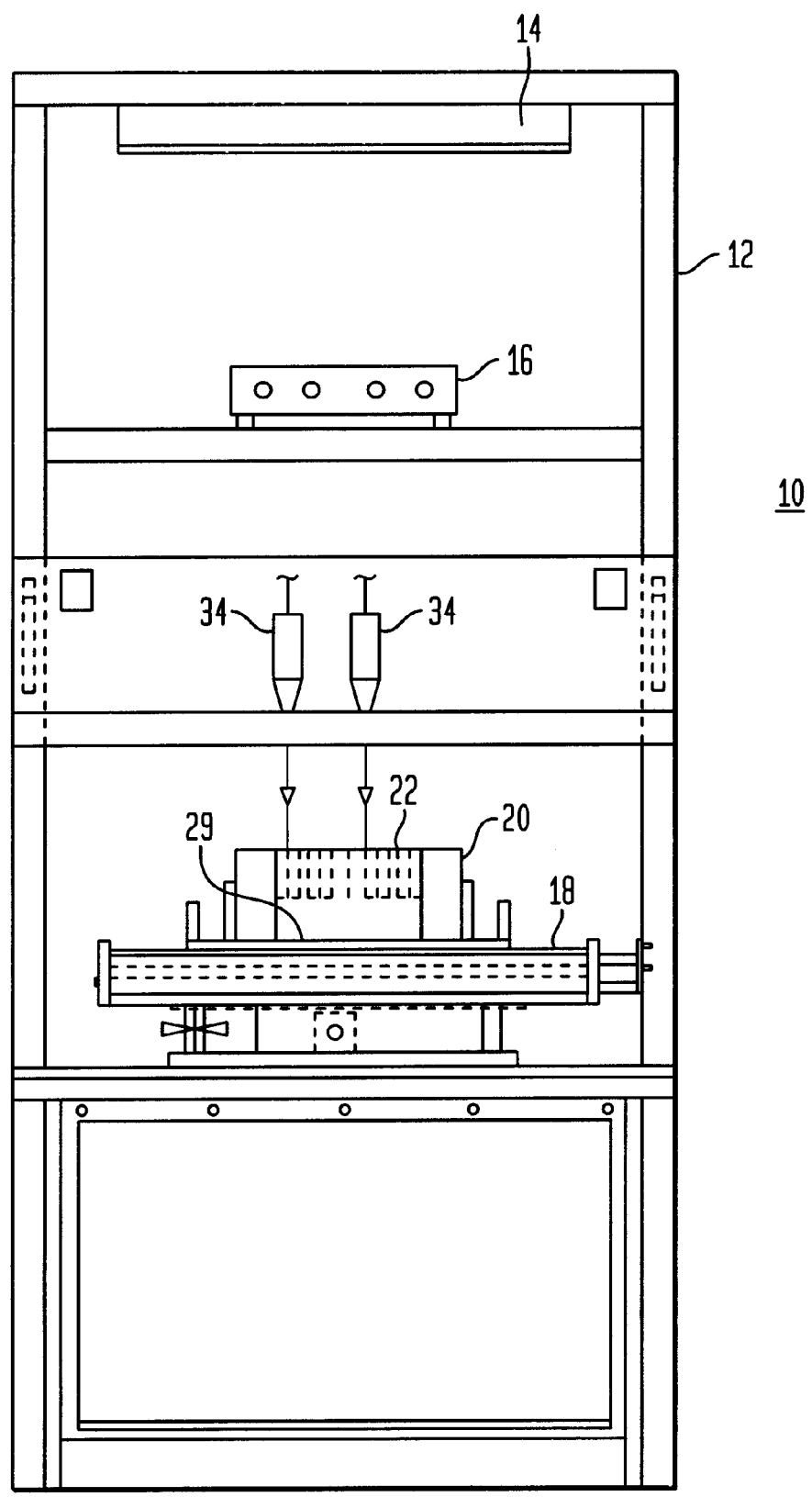
FIG. 1 is a front plan view of an apparatus for use in carrying out the present invention.
Figure 2:
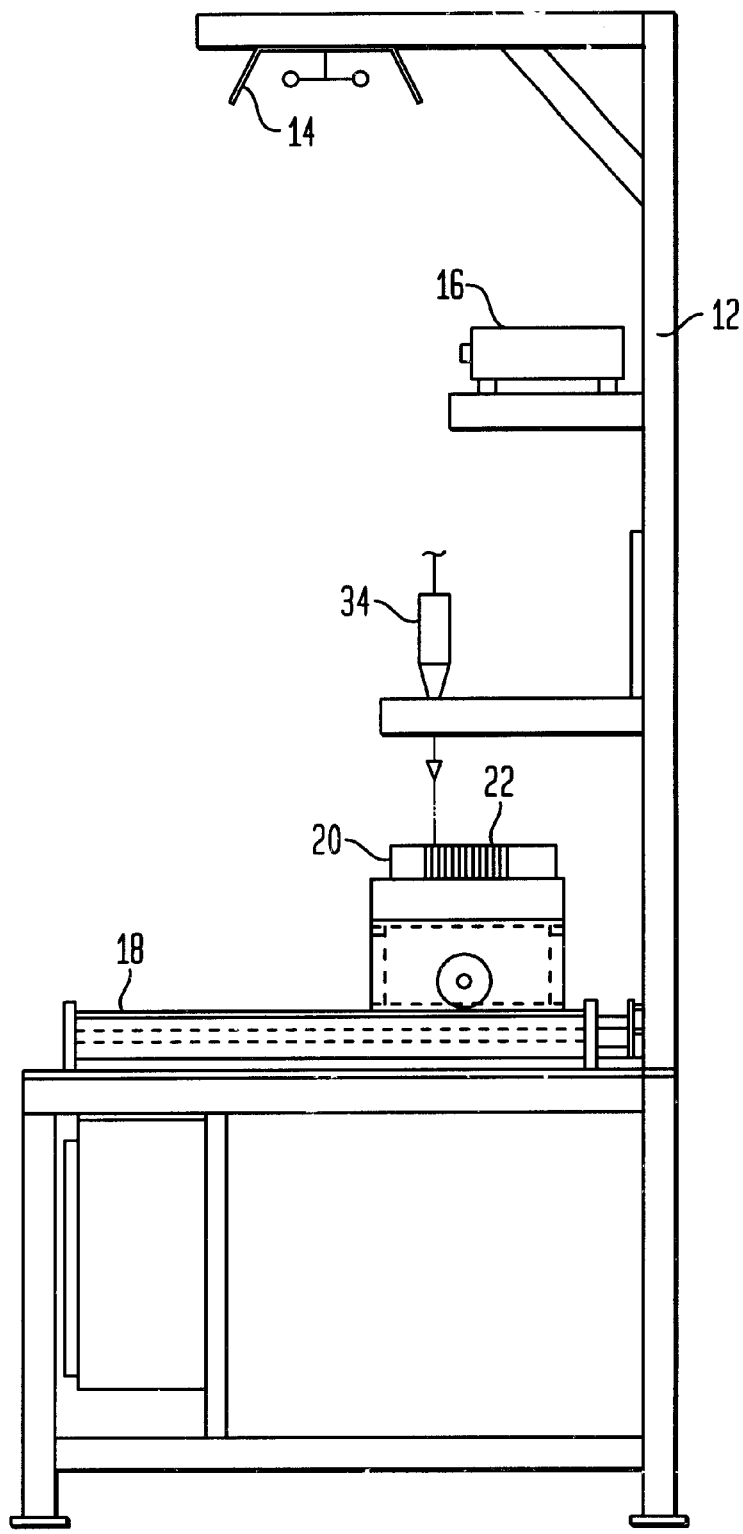
FIG. 2 is a side view of the apparatus of FIG. 1.

In FIGS. 1 and 2, there is shown a front view and a side view, respectively, of a drop freezing apparatus 10 constructed in accordance with the present invention. As can be seen, the apparatus 10 comprises a frame 12 normally constructed of structural members, including stainless steel tubing, and may have an aluminum frame to support the various components that make up the drop freezing apparatus 10. Other standard components may include an overhead light 14 and a control module 16 within easy reach of the operator so that certain of the parameters of the freezing process and the apparatus 10 can be controlled by the operator. As also can be seen, there is a servo-controlled x-y table 18 affixed to the overall frame 12. The overall apparatus 10 has, as its basis, the operation of an x-y table 18 and x-y tables are presently commercially designed and supplied by various companies, one of which being Payne Machine Co., Ltd of Ontario, Canada.

Such x-y tables, their indexing systems for controlling the table function as well as the working surface to move a work piece in the x and y directions are therefore available and are regularly designed for a wide variety of applications and are also normally controllable to select the deceleration and deceleration of the table within a predetermined range. Typically the x-y table is controlled by servo motors that are affixed to screw assemblies that carry out the movement of the table itself in the two directions. As such, depending upon the particular specifications, the x-y table can be manufactured and supplied commercially with a wide range of parameters, including movement distances, speed, acceleration, deceleration and the like in the x and y directions.

With the present invention, a tray 20 is positioned atop of the x-y table 18. The tray 20 is heavily insulated and contains a quantity of the liquid cryogen, preferably liquid nitrogen, to carry out the purposes of this invention. The tray 20 is firmly secured to and moves along with the x-y table 18 and thus, the tray 20 can move in both the x and y directions, however, as will be seen, the tray 20 is also readily removable from the x-y table 18 for the purpose of removing the frozen beads from the tray 20. As will be seen, the tray 20 is preferably a rectangular shaped, insulated, stainless steel tray. Within the tray 20 are located a plurality of cells 22, shown schematically in FIGS. 1 and 2, and which will also be later explained.

Figure 3:
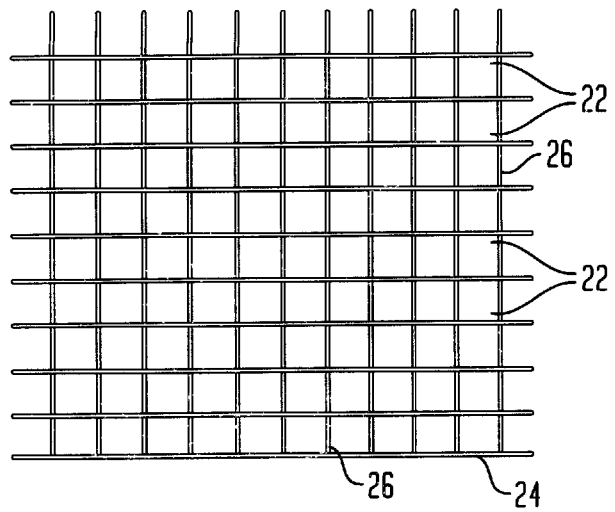
FIG. 3 is a top view of a grid that is used in carrying out the present invention.
Figure 4:
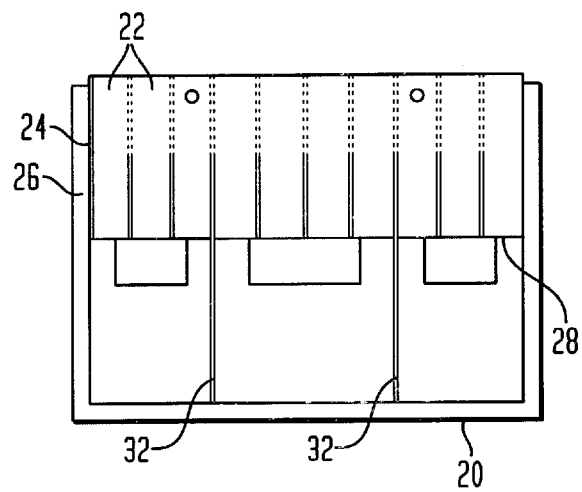
FIG. 4 is a side view of the grid of FIG. 3.
Figure 5:
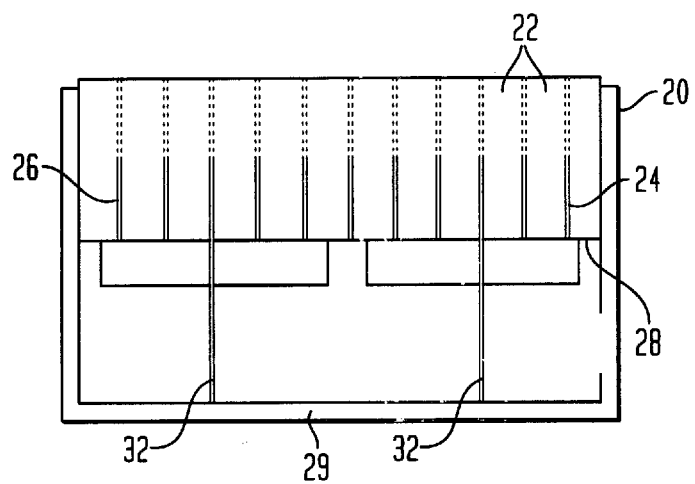
FIG. 5 is an end view of the grid of FIG. 3.

Turning now to FIGS. 3–5, taken along with FIGS. 1 and 2, there are shown, respectively, a top view of a grid 24, a side view of that grid 24 and an end view of that grid 24 that is used to form the cells 22 of the present invention. As seen, the grid 24 is made up of a plurality of planar metal plates 26 that are affixed together in an interrelated manner so as to form the plurality of individual cells 22 and which are open at the grid bottom 28 so that, once formed, the frozen drops are free to fall to the bottom 29 of tray 20. Each of the cells 22 made from the grid 24 are generally of a rectangular pattern with each cell 22 formed of cell walls 30. The cells 22 are also preferably rectangular in shape, more preferably square, however, other configurations of cells 22 could be utilized as long as each cell 22 is formed so as to provide isolation from adjoining cells as the drop freezes and falls to the bottom 29 of the tray 20. The metal plates 26 are preferably made of stainless steel and can be welded together in constructing the grid 24. As can be seen, the metal plates 26 extend downwardly and then terminate at an area above the bottom 29 of the tray 20 so that the frozen beads can accumulate as described. At least two of the plates can extend to the bottom of the tray so as to form legs 32 to support the grid 24 upon the bottom of the tray 20, however, as an alterative construction, the upper portion of the grid 24 may be formed so as to be easily affixed to the upper peripheral rim of the tray 20.

Returning briefly to FIGS. 1 and 2, as a part of the drop freezing apparatus 10, there are a pair of drop forming dispensers 34 that form the drop of reagent and cause the drop to be dispensed at a precise point in time. The drop, when dispensed, travels downwardly by gravity to enter the tray 20 filled with the liquid nitrogen. As indicated, there are two such drop forming dispensers 34 as the preferred embodiment shown in FIGS. 1 and 2, however, there may be one or more of such drop forming dispensers 34 that can be used in carrying out the present invention depending upon the throughput of the particular apparatus. In general, such drop forming dispensers 34 are also commercially available or readily designed to have a nozzle tip that is specifically selected to provide a drop of the desired size. By selecting the nozzle tip having the proper internal diameter, the predetermined diameter drop can be formed and dispensed by the drop forming dispenser 34. In general, the drop forming dispensers 34 may have small bottles, vials or beakers that can hold up to about 1 liter of liquid reagent to be dispensed at the rate of about 20 microliters per second per dispenser.

Figure 6:
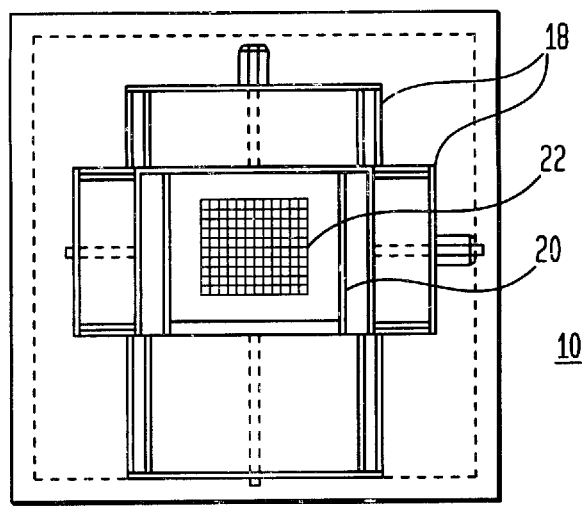
FIG. 6 is a top view of the translating table function of the apparatus of FIG. 1.

Turning now to FIG. 6, there is shown a top view of the tray 20 on the x-y table 18 and showing the mechanism used with the x-y table 18 to translate the tray 20 in the direction along the x axis or along the y axis by use of the x-y table. Thus, the tray 20 can be translated in accordance with the normal function of an x-y table 18 to move the tray 20 in a stepwise movement in the direction of the x axis and the y axis so that each cell 22 can receive a drop of reagent to freeze that drop into a bead of reagent and the cells 22 can provide isolation so that only one drop will be allowed to enter any cell 22 whereupon the x-y table 18 will move the tray 20 to a different location to allow the next drop to enter the subsequent cell 22.

Figure 7:
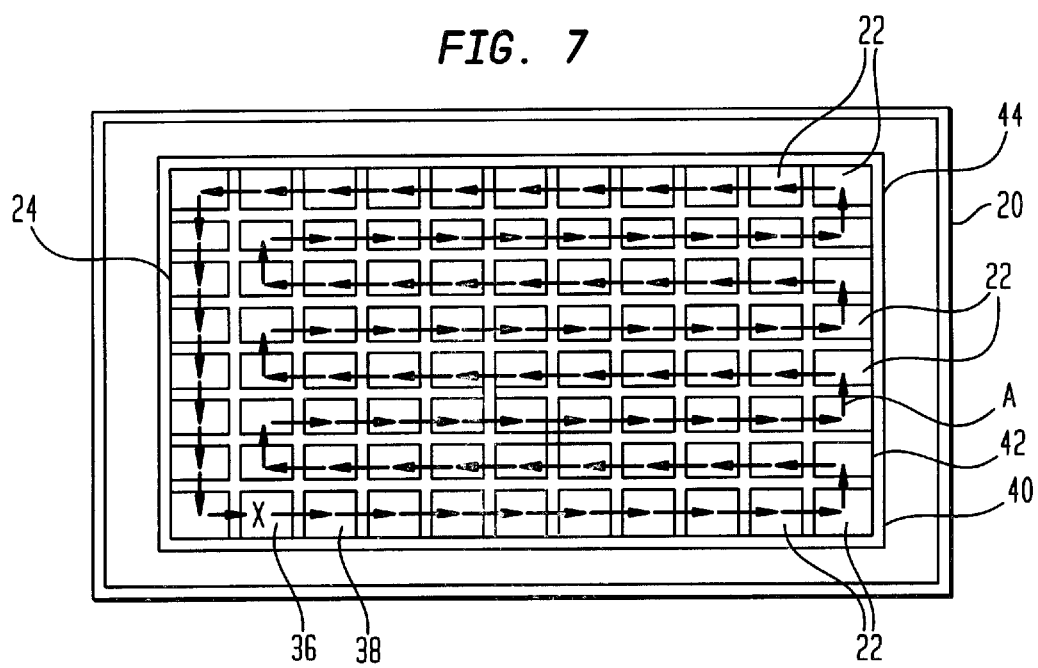
FIG. 7 is a schematic view of a typical translating path used with the present invention.

Accordingly, in FIG. 7 there is shown a top schematic view of the tray 20 having a grid 24 showing all of the individual cells 22 that are formed in the interior of the grid 24. As will be seen, the formation of the cells 22 may be through a variety of means, it only being preferred that the overall flow of the liquid nitrogen within the tray 20 be relatively unimpeded and thus, in the preferred embodiment, the individual cells 22 can be formed by means of the aforedescribed grid 24 that is placed within the tray 20 and can be readily removed therefrom. Thus, since the grid 24 is cellular, the liquid nitrogen is free to fill all of the cells 22 equally and the grid 24 is easy to remove for the harvesting of the frozen beads at the end of a particular cycle of forming such beads.

Accordingly, with the use of the x-y table 18, the initial drop of reagent may be dropped into the initial cell indicated as 36 and after that drop has entered the liquid nitrogen in that cell, the x-y table can translate the tray 20 so that the next cell 38 in that row can now receive the next drop of reagent. By such means, at the point in time that each drop is introduced into a cell 22, the x-y table 18 is at a standstill, however, the table then translates to position the next cell 22 under the drop forming dispenser 34 to receive the next drop. Continuing with FIG. 7, therefore, as the arrows A show, the tray 20 is translated so the each subsequent drop falls into the cells progressing across the first row 40 and the tray 20 is then translated along the y axis so that the next or second row 42 is now positioned to receive the drops. Likewise, the tray 20 is translated along the x axis to fill all of the cells in the second row 42, with the tray 20 moving in the opposite direction as opposed to the movement during the filling of the cells 22 in the first row 40. As can thus be seen, the tray 20 can thus progress by being translated by the x-y table 18 row by row until the entire tray 20 of n rows of cells 22 have received a drop of reagent, but omitting the extreme left cells of each row. Thus, the arrows A are intended to show the progressive steps of the drops as they are deposited into the cells 22, it being seen that the actual movement of the tray 20 will progress in the direction opposite of the arrows A.

Therefore, as the last drops are deposited into the cells in the last row 44, the tray is translated along the y axis so that the cells at the extreme left ends of the rows are filled so that the x-y table 18 eventually returns to the initial cell 36 to repeat the overall process. By establishing the number of cells, the size of the cells and the speed of the x-y table 18, the design of the drop forming apparatus 10 can be accomplished to assure that when the x-y table 18 returns to again provide a drop of reagent into the initial cell 36 to repeat the process, sufficient time has passed to insure that the first drop into that initial cell 36 has been fully frozen and deposited at the bottom 29 of the tray 20.

Also as can now be seen, the movement of the x-y table 18 is such that there is some agitation of the liquid nitrogen, that is, rather than using the smooth motion sought by the Chatterjee et al reference, the present invention takes advantage of the intermittent, stop and go movement of the x-y table 18 to cause sufficient agitation to disrupt the layer of nitrogen gas that forms under the drop as it floats on the surface of the liquid nitrogen. Again, as stated, the agitation is not severe so as to be a jerky motion but is sufficient to form ripples at the surface of the liquid nitrogen and to disrupt the layer of gaseous nitrogen. Since, however, that gaseous nitrogen is a poor conductor of heat, the gas layer slows the freezing of the liquid drops and thus, the agitation will cause a decrease in the thickness of the gas layer and enhance the freezing process.

Figure 8:
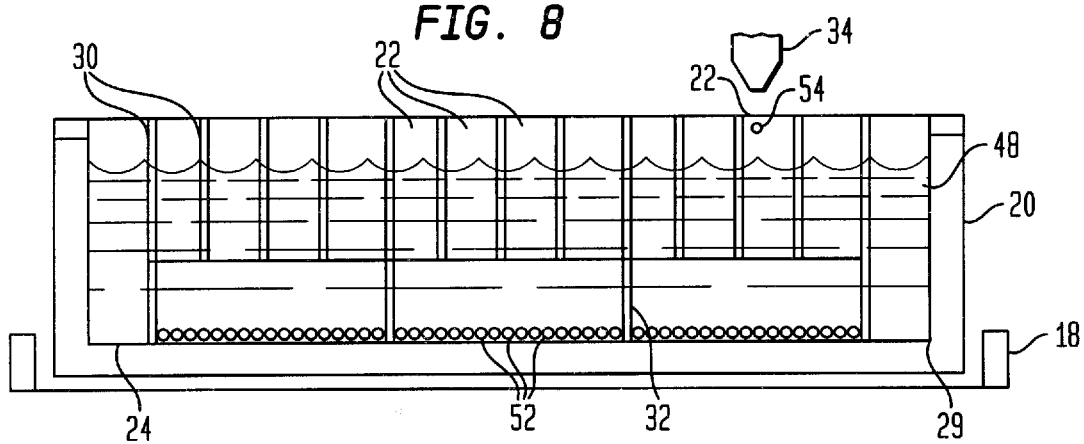
FIG. 8 is a side schematic view of a tray used in connection with the present invention.

Turn now to FIG. 8, there is shown a side cross sectional schematic view of the tray 20 of the present invention and which is filled with the liquid nitrogen 48. As can be seen, the grid 24 includes vertically oriented cell walls 30 that form the cells 22 and those cell walls 30 extend from at or above the surface of the liquid nitrogen to a point below that surface, but the cell walls 30 do not reach the bottom 29 of the tray 20. Instead the cell walls 30 remain short of bottom 29 such that the beads 52 are free to gather and collect on the bottom 29 of the tray 20 where they can be harvested in a batch process. The cells 22 may be of a variety of geometric configurations, however, for purposes of efficiency it is preferred that the cells 22 be formed in the shape of a rectangle, preferably a square, so that the optimum number of cells 22 can be provided and also so that the rectangular configuration of the overall tray 22 is best suited for the translation of the tray 22 along the x axis and the y axis by the x-y table 18.

Thus, as the drop forming dispenser 24 provides a drop 54, that drop 54 falls downwardly by gravity and enters a cell 22 where it remains on the surface for a period of time and thereafter as it freezes, the drop 54 falls to the bottom 29 of the tray 20 as a frozen bead 52.

As such, the beads 52 can be harvested by a batch process by removing the grid 24 forming the cells 22 to gain full access to the beads 52. The tray 20 containing the beads 52 can simply be poured out into a lyophilizer tray for subsequent lyophilization. Alternatively, the bottom 29 may be slanted such that the beads 52 all collect at one end of the bottom 29 for the harvest or as a further alternative, there may be a conveyer that the continually remove the beads 52 from the bottom 29 of the tray 20.

As explained, after the beads are harvested, they are taken to be lyophilized to dry the beads out to make them suitable for the intended purpose for analysis. The liquid reagent used in the present invention to form the frozen, lyophilized beads are then used to carry out a suitable chemical analysis, including enzymatic assays of glucose, immunoassays for troponin, or chemical analysis for trace metals. Such solutions may be of biological molecules, i.e. antibodies, enzymes and the like in a solution with a high solids content, that is, of about 1 to 20 percent of suitable solids such as carbohydrates, polymers, salts and the like.

As a specific example of the use of the present invention to manufacture beads containing IgM antibody and trehalose, a stock solution (160 ml) containing A5 antibody at 0.85 ug/ml in 0.3 M trehalose is prepared and fed to the dispensing heads at the rate of about 20 ul per second through each dispenser head while the x-y table is in motion. During the process, occasional replenishment of the cryogen nitrogen liquid is required in order to replace evaporated liquid. The dispensers and x-y table is stopped and the grid is removed and the liquid containing the beads is poured from the tray into a lyophilizer tray. The lyophilizer tray is initially at −20 degrees C. and is continued at that temperature for 16 hours at a vacuum of less than 100 millitorr. The temperature is then increased to 0 degrees C. and held at that temperature for one hour, and is then increased to 25 degrees C. for one hour before the vacuum is shut off. The lyophilizer chamber is vented and the dried beads removed. The recovered beads are single, round spheres with no double beads being apparent. No beads are found showing the characteristic "stems" that occur when double beads break apart.

While the invention has been disclosed and described with respect to specific embodiments, it will become apparent that variations and modifications may be made therein, and it is therefore intended in the following claims to cover each such variation and modifications as falls within the true spirit and scope of the invention.

I claim:

1. An apparatus for forming frozen beads of a reagent, said apparatus comprising:
    a dispensing means for dispensing drops of a liquid reagent of a predetermined chemical content,
    a tray for containing a quantity of a liquid cryogen, said tray adapted to receive the reagent drops from said dispensing means,
    said tray being divided into a plurality of discrete cells adapted to receive and isolate a reagent drop that falls into any one of said discrete cells,
    means to create a relative, intermittant motion between said dispensing means and said tray after the receipt of a drop into one of said discrete cells to align another of said plurality of discrete cells for receipt of a subsequent drop into said another of said discrete cells.

2. An apparatus for forming frozen beads of a reagent as defined in claim 1 wherein said means to create relative motion comprises translating said tray along a linear path while maintaining said tray stationary.

3. An apparatus for forming frozen beads of a reagent as defined in claim 2 wherein said container has an x and a y axis and said translation is along said x or said y axis.

4. An apparatus for forming frozen beads of a reagent as defined in claim 3 wherein said tray is translated along both said x and said y axis.

5. An apparatus for forming frozen beads of a reagent as defined in claim 3 wherein said cells are formed in a plurality of rows of cells along said x axis and said tray is translated along said rows of cells before being translated along said y axis to a subsequent row of cells.

6. An apparatus for forming frozen beads of a reagent cells as defined in claim 1 wherein said cells are comprised of cell walls in the form of a grid.

7. An apparatus for forming frozen beads of a reagent cells as defined in claim 6 wherein said grid is formed of metal planar plates joined together.

8. An apparatus for forming frozen beads of a reagent cells as defined in claim 7 wherein said cell walls extend from substantially at the surface of the liquid cryogen to a point spaced above the bottom of said container.

9. An apparatus for forming frozen beads of a reagent cells as defined in claim 8 wherein said cell walls form rectangular cell configurations and said walls comprise a grid.

10. An apparatus for forming frozen beads of a reagent cells as defined in claim 6 wherein said grid comprises a unitary frame so as to be readily removable.

11. A method of forming frozen beads, said method comprising the steps of:
    providing at least one dispenser for forming liquid drops of a predetermined composition,
    providing a tray having a bottom and containing a liquid cryogen,
    providing a grid within the tray, said grid having a plurality of cells formed therein extending downwardly from about the surface of the liquid cryogen to a point spaced from the bottom of the tray,
    causing one of the liquid drops to fall from the at least one dispenser to fall into one of the plurality of cells,
    causing relative motion between said tray and said at least one dispenser to align another of the plurality of cells with the at least one dispenser and;
    causing a further liquid drop to fall from the at least one dispenser into the another of the plurality of cells whereupon the drops freeze into frozen beads by contact with the liquid cryogen; and
    allowing the frozen beads to fall to the bottom of the tray.

12. A method of forming frozen beads as defined in claim 11 wherein said step of causing relative motion between said tray and said at least one dispenser comprises maintaining said at least one dispenser stationary while translating said tray.

13. A method of forming frozen beads as defined in claim 12 wherein the step of translating the tray comprises moving the tray along a linear path.

14. A method of forming frozen beads as defined in claim 12 wherein said step of translating the tray along a linear path comprises moving the tray along the x or y axis of the tray.

15. A method of forming frozen beads as defined in claim 12 wherein the step of translating the tray along a linear path comprises moving the tray along both the x axis and the y axis of the tray.

16. A method of forming frozen beads as defined in claim 13 wherein the step of providing a tray comprises providing a generally rectangular tray having generally rectangular cells formed therein.

17. A method of forming frozen beads as defined in claim 13 wherein the step of translating the tray comprises intermittently stopping the motion of the tray and controlling the motion of the tray intermediate the intermittent stops.

18. A method of forming frozen beads as defined in claim 17 wherein said step of controlling the motion of the tray comprises controlling the acceleration and deceleration of the tray.

19. A method of forming frozen beads as defined in claim 13 wherein said method further comprises the step of removing the frozen beads from the bottom of the tray by a batch process.

20. A method of forming frozen beads as defined in claim 19 wherein said method of removing the frozen beads from the tray comprises pouring the liquid cryogen and the beads from the tray.

* * * * *